Feb. 7, 1928.
A. C. WOOD
1,658,069
MILEAGE PERIOD INDICATING ODOMETER AND RESET MEANS
Original Filed Sept. 5, 1922    4 Sheets-Sheet 1
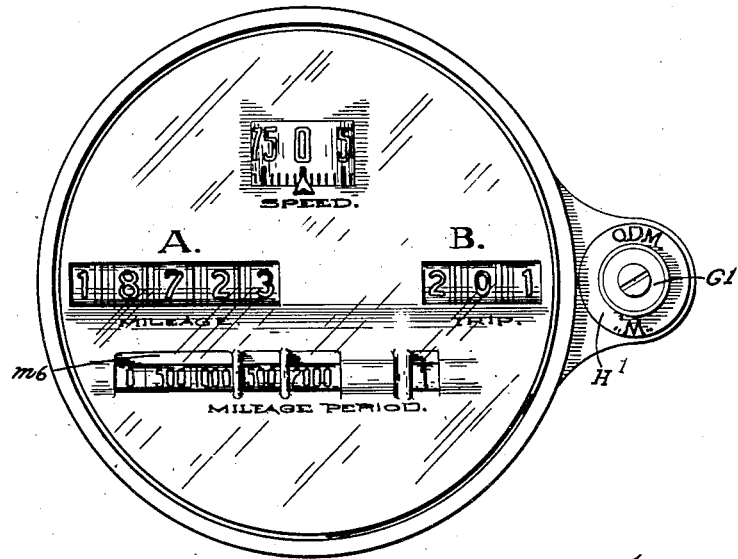
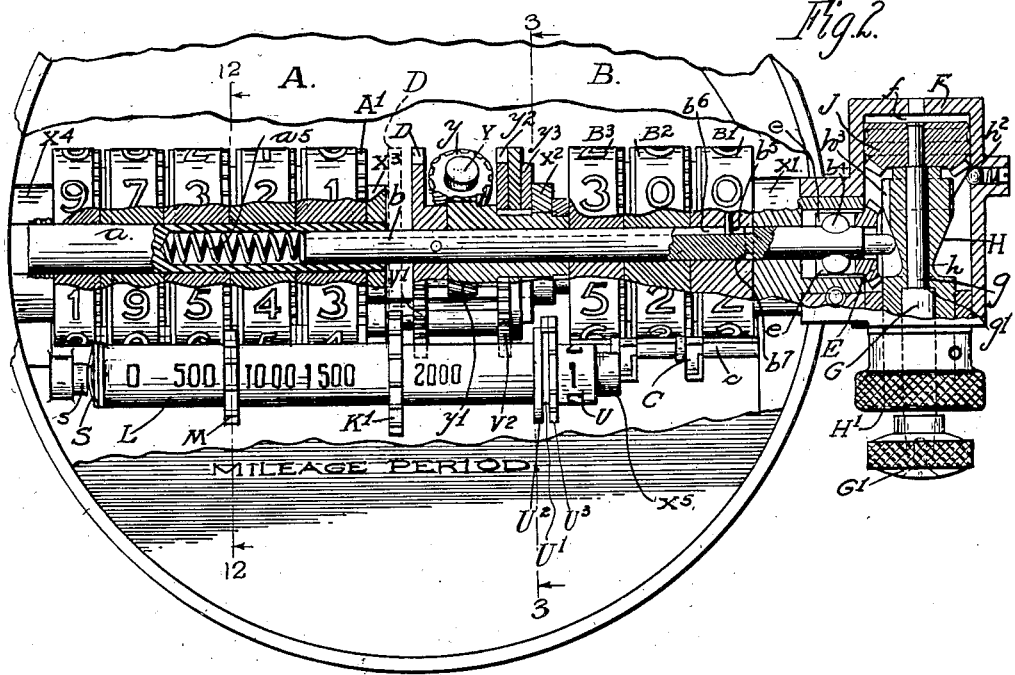
INVENTOR.
ANDREW C. WOOD.
BY Burton & Burton
his ATTORNEYS.
WITNESS.

Feb. 7, 1928.  
A. C. WOOD  
1,658,069  
MILEAGE PERIOD INDICATING ODOMETER AND RESET MEANS  
Original Filed Sept. 5, 1922  4 Sheets-Sheet 2
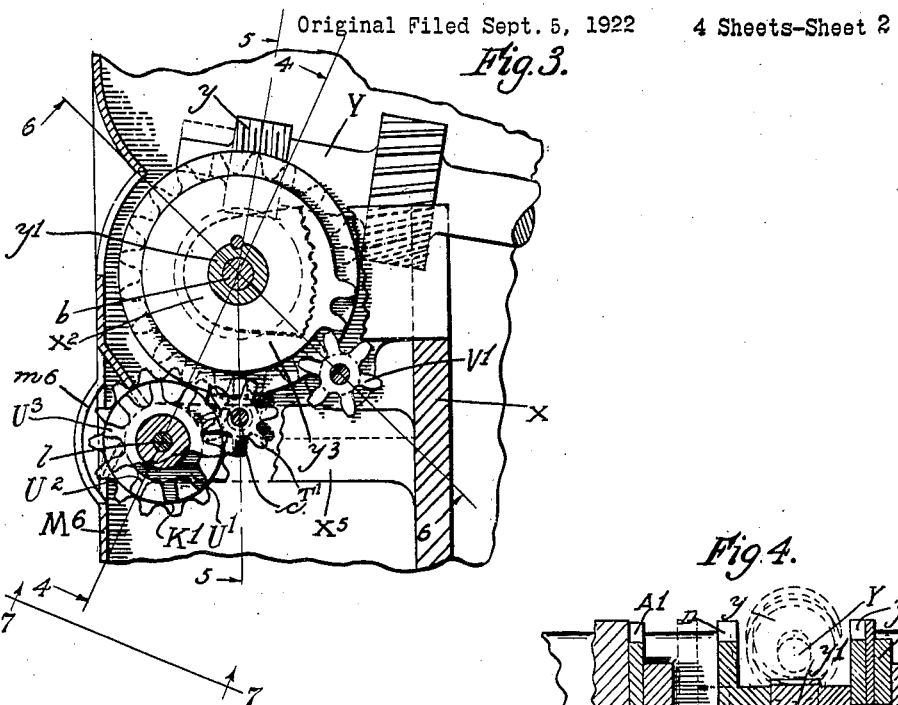
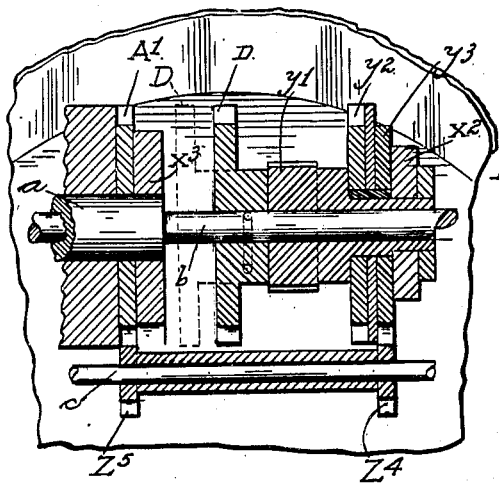
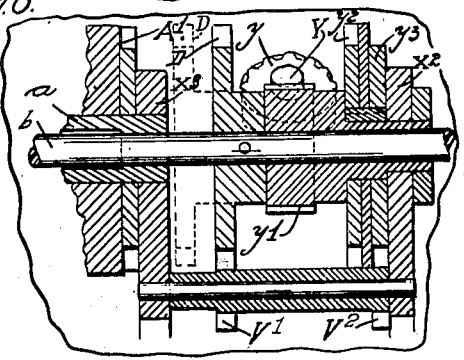
INVENTOR.  
ANDREW C. WOOD.  
By Burton & Burton  
his ATTORNEYS.
WITNESS.  
J. C. McKnight.

Feb. 7, 1928.   1,658,069
A. C. WOOD
MILEAGE PERIOD INDICATING ODOMETER AND RESET MEANS
Original Filed Sept. 5, 1922   4 Sheets-Sheet 3
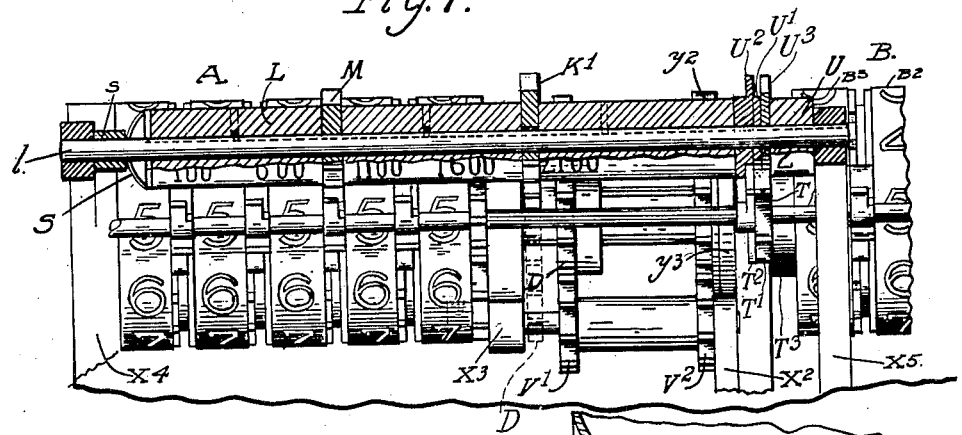
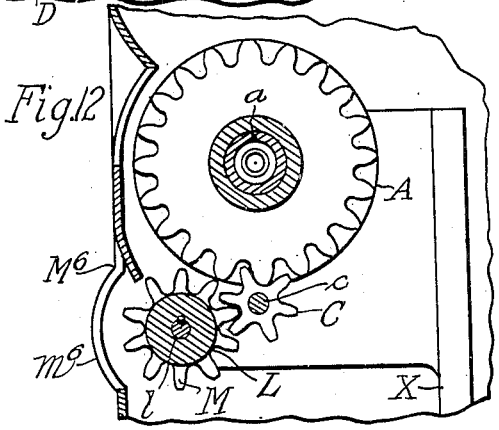
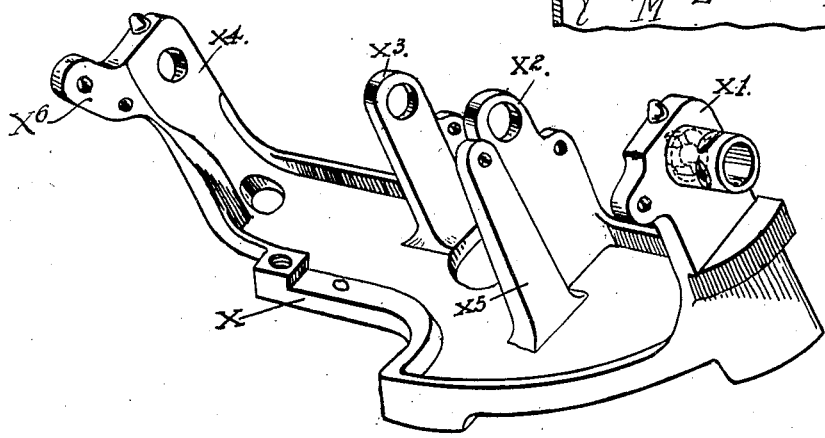
INVENTOR.
ANDREW C. WOOD.
BY
his ATTORNEYS.
WITNESS.

Feb. 7, 1928.
A. C. WOOD
1,658,069
MILEAGE PERIOD INDICATING ODOMETER AND RESET MEANS
Original Filed Sept. 5, 1922    4 Sheets-Sheet 4
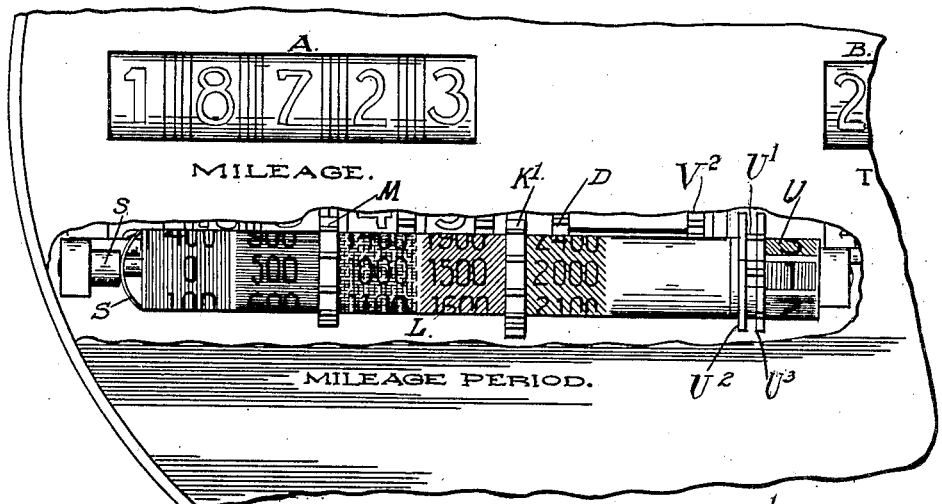
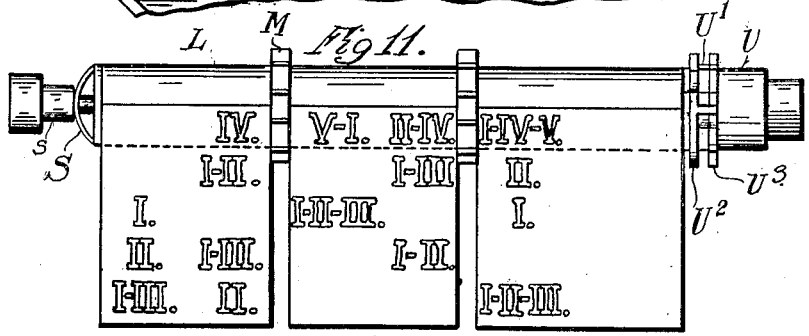
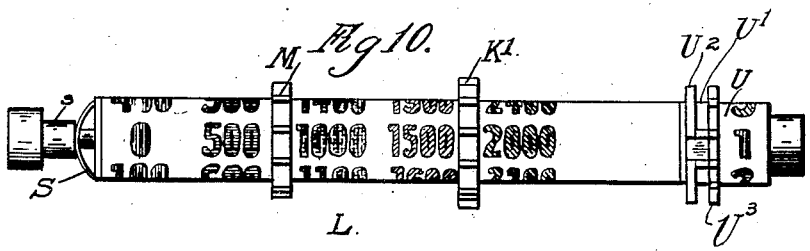
INVENTOR.
ANDREW C. WOOD.
BY his ATTORNEYS.
WITNESS.

Patented Feb. 7, 1928.

1,658,069

UNITED STATES PATENT OFFICE.

ANDREW C. WOOD, OF CHICAGO, ILLINOIS, ASSIGNOR TO STEWART-WARNER SPEED-OMETER CORPORATION, OF CHICAGO, ILLINOIS, A CORPORATION OF VIRGINIA.

MILEAGE-PERIOD-INDICATING ODOMETER AND RESET MEANS.

Application filed September 5, 1922, Serial No. 586,055. Renewed July 20, 1927.

The purpose of this invention is to provide an improved form and construction of an odometer-operated mileage period indicating device, particularly adapted for indicating to the driver of the vehicle by means of the odometer, the expiration of the intervals suitable to elapse between various attentions required by the vehicle or its appurtenances. Beside the purpose of providing a compact, economical and easily understood instrument for indicating the various mileage periods, this invention has a further purpose of adapting the mileage period indicating device to be reset at any time and to any degree by the odometer resetting shaft or stem. It consists in the elements and features of construction shown and described, as indicated in the claims.

In the drawings:—

Figure 1 is front face view of a combined odometer and speedometer, equipped with this invention.

Figure 2 is a front elevation of the same with the face plate partly broken away disclosing the interior mechanism, the same being shown in section at the plane of the axis of the odometer train and the reset shaft, the latter being turned 90° from the position shown in Figure 1.

Figure 3 is a section at the line, 3—3, on Figure 2.

Figure 4 is a section at the line 4—4 on Figure 3.

Figure 5 is a section at the line 5—5 on Figure 3.

Figure 6 is a section at the line 6—6 on Figure 3.

Figure 7 is a sectional elevation looking in the direction of the arrow, 7, on Fig. 3, of the odometer train and the mechanism thereon removed from the casing, section being made axially with respect to the shaft of the mileage period indicating device.

Figure 8 is a perspective view of the frame of the odometer and mileage period indicating device stripped of mechanism.

Figure 9 is a broken elevation or face view with the dial plate partly broken away for showing the mileage period indicating drums in elevation with a certain form of color marking for identifying the several mileage zones.

Figure 10 is a similar view of the mileage period indicating drum for showing an additional form of color marking.

Figure 11 is an elevation of an indicating drum with its covering strips bearing the markings stripped off to enable all the markings to be read, said markings being of a special form in lieu of mileage numerals.

Figure 12 is a section at the line, 12—12, on Figure 2.

The drawings show the odometer portion of an instrument of the nature of a combined speedometer and odometer with elements constituting and embodying the present invention associated with and appended to the odometer mechanism. The odometer is of familiar type, comprising a main train, A, and a trip train, B, having their dials mounted about a common axis for revolving side by side, with customary decimal carrying means comprising carrying pinions as C, all loose on a shaft, $c$, parallel to the dial train shaft, and both trains deriving their motion from driving-gear-means-in-common, the trip train shaft being adapted to be shifted for disengagement from said driving-gear-means-in-common for the purpose of resetting the trip train without affecting the main train. The odometer mechanism of the character indicated, comprises a frame, X, having standards, $X^1$, $X^2$, $X^3$ and $X^4$, for the odometer train shaft. The inleading power shaft, Y, by a worm gear, $y$, thereon, drives a gear, $y^1$, which has rigid with it rigidly united spur gear, $y^2$, and mutilated gear, $y^3$, of which said mutilated gear, $y^3$, through the carrying pinion, $Z^4$ $Z^5$, hereinafter more particularly described, drives the initial dial wheel, $A^1$, of the odometer main train, A; and the spur gear element, $y^2$, by means of the double gear pinion, $V^1$ $V^2$, driving the gear, D, fast on the inner end of the trip train shaft, $b$, engaged as hereinafter described with the initial dial wheel, $B^1$, of the trip train, B, rotates said initial dial wheel. The remaining dial wheels of both trains are operated from the initial wheels respectively by the usual decimal-carrying pinions of familiar construction, and requiring no description, except that the carrying pinion, consisting of driven and driving elements, $Z^4$ and $Z^5$, separated along its axis but integral, communicates decimally-reduced rotation from the mutilated gear element $y^3$, to the initial dial wheel, $A^1$, of the main train, A, whereby that dial has the same speed as the second dial, $B^2$, of the trip train. The dial wheels, $B^1$, $B^2$, $B^3$, of the trip train are stopped longitudinally of the shaft, $b$, between the bearing standards, $X^1$ and $X^2$, while the shaft, $b$, is adapted for sliding longitudinally for the adjustment hereinafter described, carrying with it in said sliding movement the gear, D, fast on the left hand end of said shaft which is thereby in the first step of said movement taken out of mesh with the left hand gear element, $V^1$, of the pinion, $V^1$ $V^2$, and thereby disconnected from the driving-gear-in-common of the two trains, viz, the gear $y^2$ $y^3$; and in the next step of said inward thrust and sliding movement the gear, D, is carried into mesh with a gear, $K^1$, on the shaft of an auxiliary or supplemental device, hereinafter described and shown as a mileage period indicating device, but which might be adapted for any other auxiliary or supplemental function. This sliding movement of the trip train shaft, $b$, is produced by certain cams hereinafter mentioned on the reset shaft. The shaft, $b$, has at its right hand end a bevel gear pinion, E, for driving engagement with a pinion, J, hereinafter mentioned, on the reset shaft. The pinion, E, is rotatively engaged with the shaft, $b$, by splines, $b^4$, on said shaft engaging longitudinal slots, $e$, in the hub of the said gear; and the shaft, $b$, protrudes entirely through said gear, so that its right hand end is exposed for actuation by the reset devices, as hereinafter described. The shaft, $b$, is engaged with the initial trip train dial wheel, $B^1$, by a spline or feather pin, $b^5$, projecting inward from the body of said dial wheel engaging a longitudinal slot or key seat, $b^6$, which extends the entire length of said shaft, $b$, toward the left of said dial wheel, to permit the entrance of said dial wheel with its said feather pin engaging said longitudinal key seat; and said shaft, $b$, has a circumferential groove, $b^7$, intersecting the longitudinal key seat, $b^6$, at the right hand end of the latter. The shaft $b$, at the left hand end extends into an axial bore in the shaft, $a$, of the main dial wheel train, wherein there is provided a coil spring, $a^5$, which reacts against said shaft, $b$, to thrust it to the right, and to the limit at which it is stopped by the encounter of its right hand protruding end against the reset shaft, as hereinafter described. At that position of the shaft, the feather pin, $b^5$, stands engaged in the longitudinal key seat, $b^6$, at a distance to the left of said circumferential groove, $b^7$, so that the rotation of the shaft, $b$, will rotate said initial dial wheel, $B^1$, which by means of customary carrying pinions causes decimally reduced rotation of the succeeding dial wheels in the ordinary operation of the train. In a housing, F, which is mounted upon the right hand side of the standard, $X^1$, there is journaled for both rotation and thrust, a sleeve, H, having extending axially through it the reset shaft, G, having rigid with it at its inner end,—the end opposite its operating knob or handle, $G^1$,—a gear, J, adapted to mesh with the gear pinion, E, the casing, F, having a cavity as shown at $f$, beyond the gear, J, into which it may be thrust out of mesh with the pinion, E. The reset shaft, G, is reduced in diameter at its inner portion at $g$, forming a shoulder at $g^1$, for stopping the shaft longitudinally in one direction, while the gear, J, stops it in the opposite direction, so that the longitudinal movement of the reset shaft carries the sleeve, H, longitudinally in the housing for setting the pinion, J, into and out of mesh with the pinion, E. The sleeve, H, extends out from the housing and is provided at its outer end with a head or knob, $H^2$, of greater diameter than the knob, $G^1$, of the reset shaft, G, for convenience of rotating said sleeve, H, independently of the reset shaft, G. The sleeve, H, is reduced in diameter at $h$ to form a seat for the end of the shaft, $b$, at the out-thrust position of said shaft, and from said seat the sleeve is tapered enlarging in diameter toward the end at which the pinion, J, is situated, forming a longitudinally extending cam, that is, one which will operate cam-wise by longitudinal movement of the sleeve for forcing the shaft, $b$, inward. At a zone of said sleeve beyond said longitudinal cam and between the same and the pinion, J, said sleeve is cut away at two diametrically opposite points, $h^2$ and $h^3$, reducing its radius at those points to different degrees, thereby forming two seats or stop areas for the end of the shaft, $b$, for holding it at two different longitudinal positions, each of said positions being different from the position at which it is held when seated at the foot of the longitudinal cam slope, $h^1$, in the seat, $h$. It will be understood that this construction is for the purpose of providing for the longitudinal adjustment of the shaft, $b$, to three positions, the first or normal position, that at which its outer end is seated at $h$; the second, that to which it is thrust when its said end is seated at $h^2$, and the third the extreme inthrust position occupied when the outer end is seated at $h^3$. For reaching the second and third of these positions the reset shaft, G, and the sleeve, H, are pulled out to the limit for causing the pinion, J, to intermesh with the pinion, E, and the sleeve is then rotated in one direction or the other to bring either the seat, $h^2$, or the seat, $h^3$, around to the end of the shaft, $b$. To enable the operator to know which of said seats is in operative position, the knob, $H^2$, of the sleeve is desirably marked at two opposite positions with words or symbols designating respectively the functions which will be served by the adjustment to said positions respectively. For example, at the side of the knob which will be exposed toward the operator or at the upper side, when the seat $h^2$, is in position for stopping the end of the shaft, $b$, there is seen the abbreviation, "Odm." signifying odometer, since at this position the rotation of the reset shaft will reset the odometer trip train dials; and at the opposite side the knob discloses toward the operator or at the upper side the symbol, "W", denoting the warning device or mileage period indicating device, which will be reset by rotating the reset shaft at this position.

Associated with the two dial wheel trains of the odometer, there is shown an auxiliary or supplemental device operated by the driving means of the odometer train and in synchronism therewith, and adapted for any indications which sustain definite relation to the mileage indication of the odometer; as for indicating the expiration of different periods of attention required by the different parts of the vehicle in motors or accessories. This supplemental device consists of a drum, L, which is carried for rotation by a shaft, $l$, for which journal bearings are provided in a lug, $X^6$, projecting from the standard, $X^4$, and a bracket, $X^5$, projecting directly from the web of the frame, X. A gear, M, on this shaft meshes with carrying pinion which drives any selected one of the odometer main train dial wheels, as,—and preferably for most purposes of such a device,—the hundreds wheel, that is, the one of which each of its ten digits denotes one hundred miles travel of the vehicle. By this means it will be seen that the drum, L, will be rotated one step for each one hundred miles travel indicated by the odometer main train. The periphery of the drum is subdivided into mileage zones,—as shown five in number,—each of said zones being subdivided into five segments, being half the number of teeth of the gear, M, it being understood that the carrying pinion rotates two teeth distance at each step. The segments of the first zone carry the numerals, 0, 100, 200, 300 and 400. The next zone carries the numerals, 500 to 900, inclusive. The third zone carries the numerals, 1000 to 1400, inclusive and the fourth zone carries the numerals, 1500 to 1900, and the fifth zone 2000 to 2400. Understanding that the numeral "0" on the first zone is equivalent to 2500, as being the next indication to appear after the highest numeral on the fourth zone which is 1900, it will be seen that this zoned drum is adapted to call the driver's attention at the end of every 100 miles travel of the vehicle, provided he is in any manner advised to what service, attention or caretaking functions, respectively, the several mileage numerals as they successively appear relate or are intended to call to attention. To this cylinder there is added, coaxial therewith, a shorter cylinder containing a single zone divided into as many segments as there are zones on the mileage indicating drum, in the present instance, therefore, five, which are numbered respectively, "1", "2", "3", "4" and "5". This zone-number dial or drum indicated by the letter U, is connected for operation by the shaft of the mileage indicating drum by any convenient speed reducing means, such as a familiar decimal-carrying means of odometer trains, only that instead of reducing speed decimally, the intermeshing gear elements are toothed for transmitting one fifth of a revolution to the zone member dial, U, for each full revolution of the mileage period drum, L. This may be accomplished most conveniently by utilizing the carrying pinion shaft of the odometer train for journaling the three-zone carrying or transfer pinion, T, $T^2$, $T^3$, of the mileage period indicating device, which for the purpose of carrying at the ratio stated has its mutilated zones, $T^1$, $T^2$, co-operating respectively with the corresponding zones of the gear, $U^1$, $U^2$, on the shaft, L, and its complete-toothed zone, $T^3$, meshing with the complete-toothed gear element, $U^1$, on the numeral dial wheel, U.

As already indicated the third or most inthrust position of the trip train shaft, $b$, positions the gear, D, thereon, in mesh with the gear, $K^1$, which is fast on the shaft, $l$, of the mileage period signaling device, and out of mesh with the pinion member, $V^1$, which constitutes the connection of the gear, D, with the driving-means-in-common of the two odometer trains; and at that position of said shaft, $b$, it is out of driving relation to the initial dial wheel of the trip train by reason of the spline or feather pin, $b^5$, being in the circumferential groove, $b^7$, of said shaft, $b$.

All the graduated members of the drum, L, have feathered engagement with the shaft, $l$, for rotation therewith, with freedom for sliding thereon. This is for the purpose of providing frictional drive from the gear, M, to the drum members, said gear, M, being interposed on the shaft, L, between two of the graduated drum members and held frictionally between them by means of a spring spider washer, S, which is held on the left hand end of the shaft, $l$, by a suitable nut, $s$, its three spider fingers pressing against the outer surface of the left hand drum member. It is therefore possible by rotating the reset shaft and by means of it through the intermeshing gears, J and E, rotating the shaft, $b$, when the latter stands in the third position above described, to rotate the drum shaft, and thereby all the drum members thereon, regardless of the fact that they are mounted and connected for being driven by gear connection with the odometer train and remain thus connected during the period of resetting which may be accomplished by thus rotating the reset shaft at the adjusted position described.

For the mileage period indicating device there is provided a casing, $M^6$, which has a reading slot, $m^6$, at which the aligned numerals of all the zones of the zoned drum can be read as they are successively brought around thereto by the mileage indicating operation of the odometer main train, while the numeral markings of the rotor, U, are also successively brought to the reading slot for advising the driver which of the zones of the zoned drum is to be referred to for the warning which is due.

A chart informing the driver which attention is due at each of the mileages indicated by the appearance of the several mileage numerals at the reading slot, enables him to select and interpret the proper warning in each instance.

The desirable marking of the several zones and corresponding markings of the several segments of the zone number dial, U, is by color, each zone being of different ground color, and the corresponding segments of the dial, U, being respectively of the same ground color; or the numerals on the several zones, respectively, may be of different color, the numerals of the dial U, corresponding to the respective zones being of the same colors. These two color methods are shown respectively in Figures 9 and 10.

It may be found convenient to apply "job" numbers or letters to the several duties calling for attention at different mileage intervals, and to employ these job numbers or letters on the mileage period indicating drum instead of the numerals denoting the mileages as such. The markings of a drum in this manner instead of with the mileage numerals is shown in Figure 11, which may be understood as representing a drum having the markings made upon paper or fabric strips wrapped about the drum and shown in said figure unrolled or stripped from the drum so that all the markings may be read. The particular schedule according to which this drum is marked is as follows:—

Job No. 1.—Any duty requiring attention at 200 mile intervals;

Job No. 2.—Any duty requiring attention at 300 mile intervals;

Job No. 3.—Any duty requiring attention at 400 mile intervals;

Job No. 4.— Any duty requiring attention at 500 mile intervals;

Job No. 5,—Any duty requiring attention at 1,000 mile intervals;

Job No. 6.—Any duty requiring attention at 2,000 mile intervals.

I claim:—

1. In an odometer having a one-way-driven train of dial wheels, and a second train which is connected for travel-indicating operation simultaneously with the first mentioned train and is provided with means for manual resetting, and which for that purpose has a resetting shaft which extends through all the dial wheels of said train longitudinally movable for disconnecting the said second train from its said simultaneously operated connections; a gear on said resetting shaft; a supplemental rotary device operatively connected with a wheel of the first mentioned train; a gear carried for rotation with said rotary device and positioned for meshing with the above mentioned gear on the reset shaft when the latter is at position for disconnecting said second train; the driving connection of said supplemental device being adapted to permit rotation of the same independently of its said driving connection.

2. In an odometer having a trip train and a main train of dials having driving means in common, means for disconnecting the trip train from said driving means, said disconnecting means consisting of a trip train shaft which is longitudinally movable to and from the position of disconnection from the driving means; a supplemental device comprising a shaft by which it is operated and which is operatively connected with a wheel of the main odometer train; the connecting means being adapted to permit the supplemental device to be rotated at least in one direction independently of said operating connection; gears on said two shafts mentioned respectively, adapted to intermesh at said disconnected position of the first mentioned shaft, and manual means for rotating said first mentioned shaft at said position.

3. In the construction defined in claim 2, foregoing, the supplemental device having its operating shaft provided with a frictionally carried gear which meshes with a gear in the main odometer train.

4. In the construction defined in claim 2, foregoing, the first mentioned shaft being the central shaft of the trip train, said trip train being constructed for resetting by said shaft at a certain longitudinal adjustment of said shaft out of engagement with the driving means, the driving means being a gear with which the gear mentioned on said shaft meshes at normal position for operating the trip train, said gear on the trip train shaft when said shaft is at trip-train-resetting position, being in a plane intermediate the planes of said driving gear and the gear on the mileage period indicator shaft.

5. In an odometer having a trip train and a total mileage train with driving means in common; means for disconnecting the trip train from said driving means, said disconnecting means comprising a shaft axial with respect to the trip train and longitudinally movable to a position of disconnection from the driving means, an auxiliary shaft transverse to said shaft at the outer end of the latter: a sleeve on said auxiliary shaft rotatable there-about, against which sleeve said axial shaft is thrust transversely thereto, said sleeve having a circumferential cam construction in the zone of thrust of the axial shaft for actuating said axial shaft longitudinally to said position of disconnection of the trip train from the driving means by rotation of the sleeve; a supplemental device comprising a shaft by which it is operated, and means operatively connecting said shaft with a wheel of the total mileage train, the connecting means being adapted to permit said supplemental device to be rotated at least in one direction independently of said operating connection; and gears on said axial shaft and on said supplemental device shaft respectively, adapted to intermesh for operating said supplemental device at said position of disconnection of the trip train from the driving means.

6. In an odometer having a trip train and a total mileage train with driving means in common; means for disconnecting the trip train from said driving means, said disconnecting means comprising a shaft axial with respect to the trip train and longitudinally movable to a position of disconnection from the driving means, an auxiliary shaft transverse to said shaft at the outer end of the latter; a sleeve on said auxiliary shaft rotatable thereabout, against which sleeve said axial shaft is thrust transversely thereto, said sleeve having a circumferential cam construction in the zone of thrust of the axial shaft longitudinally to said position of disconnection of the trip train from the driving means by rotation of the sleeve; a supplemental device comprising a shaft by which it is operated, and means operatively connecting said shaft with a wheel of the total mileage train, the connecting means being adapted to permit said supplemental device to be rotated at least in one direction independently of said operating connection; and gears on said axial shaft and on said supplemental device shaft respectively, adapted to intermesh for operating said supplemental device at said position of disconnection of the trip train from the driving means, the sleeve on said auxiliary shaft being longitudinally adjustable and constructed for cam action on said axial shaft in said longitudinal movement, the first mentioned circumferential cam having a different shaft-thrusting capacity from said longitudinal cam; whereby two degrees of thrust upon the axial shaft from its normal trip train operating position may be obtained by two movements of the reset shaft of a different character.

7. In an odometer having a main train and a trip train and driving means in common for said trains, said driving means comprising a driving gear; a shaft which extends centrally through the trip train and a gear thereon at the inner end of the trip train, which gear at normal position of the parts for operation of both trains meshes with said driving gear; a gear at the other end of said trip train shaft journaled at fixed position in the casing, said shaft being longitudinally adjustable for occupying either of three positions, (a) with the inner gear meshed with the driving gear for normal operation of both trains; (b) with said inner gear positioned inward from any position in which it may mesh with said driving gear, and (c) with said inner gear positioned further inward out of mesh with said driving gear, and means by which at the first and second positions said shaft is in driving engagement with the trip train, and at the third position is in position out of driving engagement with said train; a cooperative device normally in driving engagement with the main odometer train, and adapted, notwithstanding said engagement, to be operated by means independent thereof; said device having a shaft provided with a gear which meshes with the first mentioned gear on the odometer trip train shaft at said third position of said shaft, and is out of mesh therewith at the other two positions; means for setting said trip train shaft at will at either of its three positions, and means for rotating it independently of the driving gear at the second and third positions.

8. In the construction defined in claim 7, foregoing the means for disengagement of the trip train shaft from the gear mentioned at the outer end thereof, consisting in that the sole driving engagement of said gear with said shaft consists of a pin in one of said members and a longitudinal groove in the other, and that the part having the longitudinal groove has at one position in the range of movement of the pin therein a circumferential groove intersecting the said longitudinal groove, and means for thrusting one of said parts longitudinally to bring said pin into registration with said circumferential groove.

9. In the construction defined in claim 7, foregoing, the means for adjusting said trip train shaft to its several positions comprising a resetting member which extends transversely of said trip train shaft at the outer end of the latter, having cams in which the outer end of the trip train shaft is seated; means to hold said trip train shaft thrust against said transversely extending member, said transverse member being movable in bearings in the direction of protrusion and recession of the cams, respectively.

10. In combination with an odometer having a trip train and a main train of dials having driving means in common, means for disconnecting the trip train from said driving means, said disconnecting means comprising a trip train shaft which is longitudinally movable to a position of disconnection from the driving means; a reset shaft transverse to the trip train shaft at the outer end of the latter; a sleeve on said reset shaft, rotatable thereabout, against which said trip train shaft is thrust transversely thereto, said sleeve having a circumferential cam construction in the zone of thrust of the trip train shaft for actuating said trip train shaft longitudinally by the rotation of the sleeve, the sleeve being extended for manual rotation; intermeshing gears on the reset shaft and trip train shaft, respectively, the reset shaft being extended for manual rotation independently of the sleeve; whereby the sleeve may be rotated to adjust the trip train shaft out of its normal driving engagement and, the reset shaft may be rotated to reset the trip train.

11. In the construction defined in claim 10 foregoing, the sleeve on the reset being longitudinally adjustable and constructed for cam action on the trip train shaft in said longitudinal movement, the first mentioned circumferential cam having a different shaft-thrusting capacity from said longitudinal cam; whereby two degrees of thrust upon the trip-train shaft from its normal trip train operating position may be obtained by two movements of the reset shaft of different character.

12. In the construction defined in claim 10 foregoing, the reset sleeve being longitudinally adjustable and formed cam-wise longitudinally for cam action on the trip train shaft in said longitudinal adjustment of the sleeve, the zone of the first mentioned cam being at the high point of the longitudinally extending cam; whereby the thrust of the zone cam may be added to the thrust of the longitudinal cam, or deducted therefrom according to the rotary position of the sleeve in the longitudinal thrust.

In testimony whereof, I have hereunto set my hand at Chicago, Illinois, this 29th day of August, 1922.

ANDREW C. WOOD.